3,503,764
Patented Mar. 31, 1970

3,503,764
CORE GLASS FOR FIBER-OPTIC STRUCTURES
HAVING HIGH INDEX OF REFRACTION
John C. Young, Portuguese Bend, Calif., assignor to The Bendix Corporation, Detroit, Mich., a corporation of Delaware
No Drawing. Filed Jan. 20, 1967, Ser. No. 610,501
Int. Cl. C03c 3/30, 13/00; G02b 5/16
U.S. Cl. 106—54    1 Claim

ABSTRACT OF THE DISCLOSURE

Glass compositions having refractive indices in the range from about 1.83 to about 1.90 and having other physical and thermal properties rendering them highly useful as core glass for fiber-optic structures consist essentially of from 5% to 20% by weight of $Nb_2O_5$, from 0 to 10% by weight of $Ta_2O_5$ the amount of $Ta_2O_5$ not exceeding 50% by weight of the amount of $Nb_2O_5$, from 15% to 45% by weight of BaO, from 15 to 30% by weight of $La_2O_3$, from 5% to 20% by weight of $TiO_2$, from 15% to 30% by weight of at least one oxide selected from the group consisting of $SiO_2$ and $B_2O_3$ at least 40% of the aggregate of said oxides being $SiO_2$, from 0 to 10% by weight of an oxide selected from the group consisting of CaO and SnO, from 0 to 15% by weight of an oxide selected from the group consisting of ZnO and CdO and from 0 to 5% of an oxide selected from the group consisting of $Na_2O$, $K_2O$ and $Li_2O$.

---

This invention relates to new glass compositions having refractive indices in the range of from about 1.83 to about 1.90 and having other physical and thermal properties rendering them suitable for use in the production of fiber-optics structures.

In the making of fiber-optics structures the core glass should have the highest possible refractive index, a medium to high softening point, a long working range and, for most applications, a relatively high thermal coefficient of expansion. High stability at the drawing and working temperatures and high transmission in the visible spectrum are also of particular importance.

In the past glasses of high refractive index have typically large amounts of lead or titanium oxides. For use in fiber-optics structures lead oxide in any appreciable quantity is objectionable, whereas because of the practical difficulty in producing titanium oxide or other titanium compounds sufficiently free of coloring impurities, glasses containing sufficient amounts of titanium to yield a satisfactorily high index of refraction are found to be objectionably colored in long fiber lengths. Also, glasses containing lead in substantial amounts are apt to be of too short working range or tend to devitrify at working temperatures.

It has now been found that these difficulties can be avoided by reducing the titanium content and by eliminating lead, as well as such heavy metals as zirconium, hafnium and thorium, except in quite small quantities and substituting relatively large amounts of niobium oxide and lanthanum oxide as major high refractive index producers. The presence of tantalum oxide, the chief natural impurity present in commercially available niobium compounds, in amounts not exceeding about 50% by weight of the amount of niobium is not injurious and in minor amounts tends to improve the stability of the compositions.

Lanthanum oxide is very similar to barium oxide in its effect on the physical properties of fiber-optics core glass other than refractive index and the two oxides are interchangeable within rather broad limits in the glass formulations. Their effects on the refractive index are, however, quite different and the index increases with greater La to Ba ratios.

In general, the glass compositions of the invention contain from about 15% to about 30% by weight of silica up to about 60% of which may be substituted by boric oxide, from about 15% to about 45% by weight of barium oxide, and from about 5% to about 20% by weight of niobium oxide, from 0 to about 10% by weight of tantalum oxide, the amount of tantalum oxide not exceeding 50% by weight of the amount of niobium oxide, from about 15% to about 30% by weight of lanthanum oxide and from about 5% to about 20% by weight of titanium oxide. Other alkaline earth oxides such as calcium oxide and strontium oxides may be added in amounts up to about 10% by weight. Zinc or cadmium oxide may be included in amounts up to about 15% by weight and the presence of alkali metal oxides such as sodium, potassium or lithium oxides, especially the latter, is useful in amounts up to about 5% by weight in controlling thermal expansion and softening point without adversely affecting other desirable properties.

The following table includes representative glass compositions of the invention, all parts being by weight:

|         | 1     | 2     | 3     | 4     | 5     | 6     | 7     |
|---------|-------|-------|-------|-------|-------|-------|-------|
| $SiO_2$ | 21    | 17    | 10    | 16    | 16    | 10    | 10    |
| $B_2O_3$| 3     | 3     | 10    | 6     | 6     | 10    | 10    |
| BaO     | 20    | 34    | 34    | 34    | 21    | 33    | 36    |
| CaO     |       |       |       |       | 10    |       |       |
| ZnO     | 5     |       |       |       | 5     |       |       |
| CdO     | 5     |       |       |       |       |       |       |
| $La_2O_3$| 20   | 18    | 18    | 20    | 20    | 22    | 22    |
| $TiO_2$ | 10    | 5     | 5     | 8     | 8     | 15    | 15    |
| $Nb_2O_5$| 14   | 16    | 16    | 16    | 14    | 10    | 7     |
| $Ta_2O_5$|      | 7     | 7     |       |       |       |       |
| $Li_2O$ | 2     |       |       |       |       |       |       |
| $n_D$   | 1.850 | 1.851 | 1.853 | 1.850 | 1.835 | 1.883 | 1.870 |

The glass compositions of the invention may be prepared by melting a mix of the batch equipment in conventional crucibles free from deleterious contaminating materials. Platinum crucibles are particularly suitable. The batch is composed of oxides or compounds decomposable to oxides under the conditions of melting in the proper proportion to yield the specified composition. In general, niobium, lanthanum, titanium, zinc and cadmium are added as oxides. Barium may be added as oxide or carbonate or, in whole or in part, as the peroxide. Calcium, strontium, sodium, potassium and lithium may be conveniently added as carbonates. Silica may be added as high grade quartz sand and boron may be added as boric acid.

The glasses melt and refine readily at temperatures between 2450° and 2600° F. They can be reheated and drawn into rods or fibers at 1500° F. or less. The glasses of the invention are virtually colorless even in long fiber lengths and they are very stable at the working temperatures.

Although the glasses of the invention are particularly useful as core glasses in fiber-optic structures, they are by no means limited to such uses. The glasses have optical properties comparable to the so-called "Lanthanum Flints" and, therefore, make excellent optical glasses. Also because of their relative hardness and resistance to chemical attack, they could be used in Abbe type refractometers for the prisms which at present are made of soft, easily scratched and tarnished lead-containing glasses.

I claim:
1. A glass composition having a refractive index of at least 1.83 and consisting essentially of from 5% to 20% by weight of $Nb_2O_5$, from 0 to 10% by weight of $Ta_2O_5$ the amount of $Ta_2O_5$ not exceeding 50% by weight of the amount of $Nb_2O_5$, from 15% to 45% by weight of BaO, from 15 to 30% by weight of $La_2O_3$, from 5% to 20% by weight of $TiO_2$, from 15% to 30% by weight of at least one oxide selected from the group consisting of $SiO_2$ and $B_2O_3$ at least 40% of the aggregate of said oxides being

SiO$_2$, from 0 to 10% by weight of an oxide selected from the group consisting of CaO and SrO, from 0 to 15% by weight of an oxide selected from the group consisting of ZnO and CdO and from 0 to 5% of an oxide selected from the group consisting of Na$_2$O, K$_2$O and Li$_2$O.

References Cited

UNITED STATES PATENTS

| | | | |
|---|---|---|---|
| 1,607,817 | 11/1926 | Dennis | 106—47 |
| 3,029,152 | 4/1962 | Milne et al. | 106—47 |

FOREIGN PATENTS

| | | |
|---|---|---|
| 55,355 | 9/1943 | Netherlands. |
| 1,047,994 | 12/1958 | Germany. |

HELEN M. McCARTHY, Primary Examiner

U.S. Cl. X.R.

106—50, 52; 350—96, 176

Disclaimer 3,503,764.—*John C. Young*, Portuguese Bend, Calif. CORE GLASS FOR FIBER-OPTIC STRUCTURES HAVING HIGH INDEX OF REFRACTION. Patent dated Mar. 31, 1970. Disclaimer filed June 3, 1970, by the inventor; the assignee, *The Bendix Corporation*, consenting.

Hereby disclaims the terminal portion of the term of the patent subsequent to Aug. 12, 1986.

[*Official Gazette July 21, 1970.*]